(12) United States Patent
Wu et al.

(10) Patent No.: US 11,736,227 B1
(45) Date of Patent: Aug. 22, 2023

(54) LONG-RANGE MODEM SCHEME

(71) Applicant: Amazon Technologies, Inc., Seattle, WA (US)

(72) Inventors: Songping Wu, Palo Alto, CA (US); Tianxiang Zhou, San Jose, CA (US); Qian Liu, San Jose, CA (US); Ming-Wei Liu, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/475,132

(22) Filed: Sep. 14, 2021

Related U.S. Application Data

(60) Provisional application No. 63/152,730, filed on Feb. 23, 2021.

(51) Int. Cl.
*H04W 4/06* (2009.01)
*H04L 1/00* (2006.01)
*H04W 84/12* (2009.01)

(52) U.S. Cl.
CPC ........... *H04L 1/0033* (2013.01); *H04W 84/12* (2013.01)

(58) Field of Classification Search
CPC .............................. H04L 1/0033; H04W 84/12
See application file for complete search history.

(56) References Cited

U.S. PATENT DOCUMENTS

2009/0208219 A1* 8/2009 Rhodes .................. H04B 13/02
398/115

* cited by examiner

*Primary Examiner* — Jamal Javaid
(74) *Attorney, Agent, or Firm* — Lowenstein Sandler LLP

(57) ABSTRACT

Technologies directed to hash spreading to extend a wireless coverage are described. One method includes receiving input bits and control information that specifies a first data rate and a second modem scheme having a second signal range that is greater than a first signal range corresponding to a first modem scheme. The method generates a first sequence of bits by scrambling the input bits, the first sequence of bits having a first number of bits. The method generates a second sequence of bits by hash spreading the first sequence of bits using a set of spreading codes. The second sequence of bits has a second number of bits greater than the first number of bits. The method generates first symbols by modulating the second sequence, converts the first symbols into radio frequency (RF) signals, and sends the RF signals to the second wireless device.

20 Claims, 9 Drawing Sheets

FIG. 3A $H_8 =$
$H_4 =$
$H_{16} =$

LONG-RANGE MODEM SCHEME

RELATED APPLICATIONS

This application claims the benefit of U.S. Provisional Application 63/152,730, filed Feb. 23, 2021, the entire contents of which are herein incorporated by reference.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 3A illustrates multiple code sets used for hash spreading for three spreading factors, corresponding to the three hash-spreading, respectively, according to at least one embodiment.

DETAILED DESCRIPTION

Figure 1:
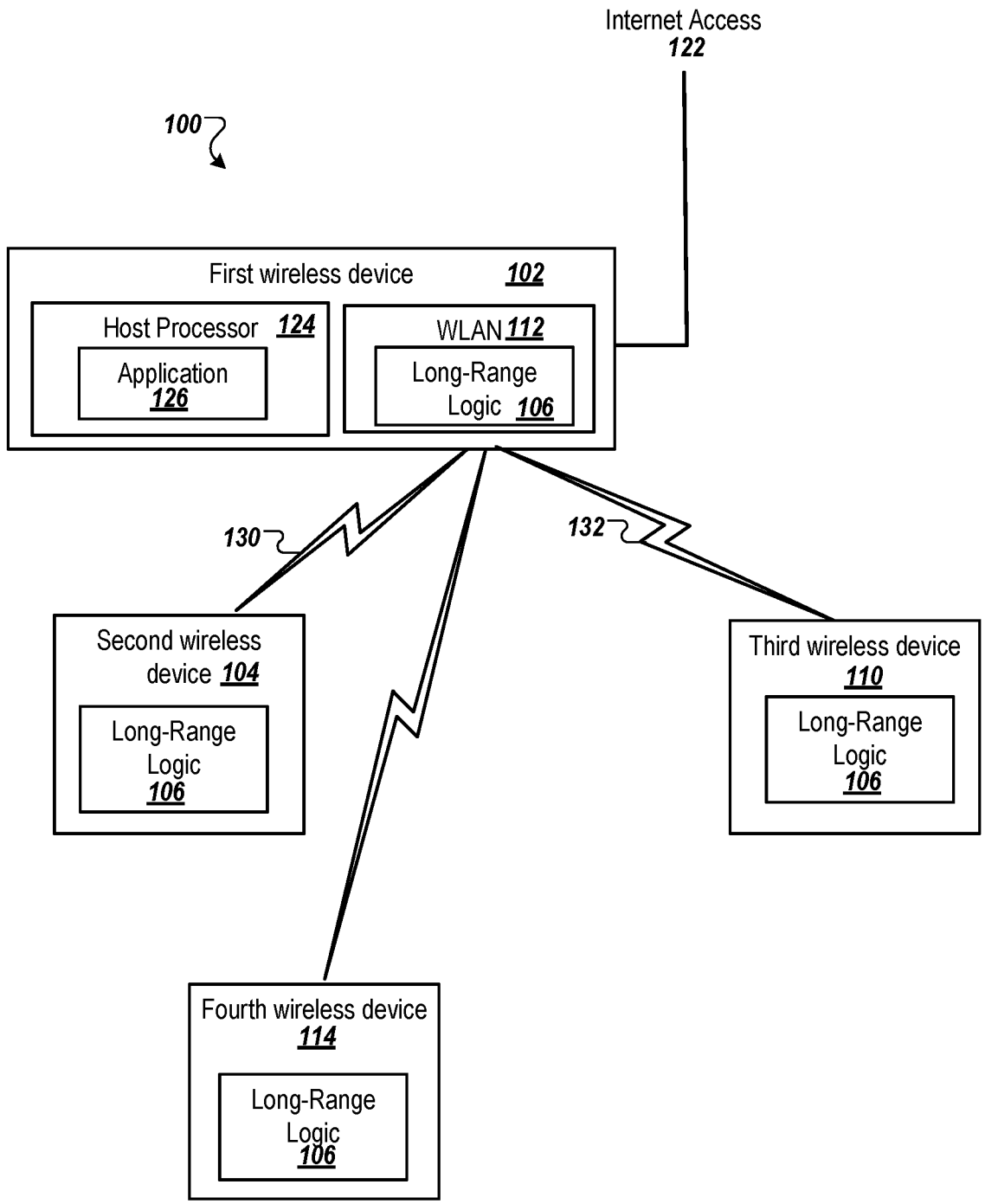
FIG. 1 is a network diagram of a wireless network with a first wireless device with long-range logic for extending a range of the wireless network, according to at least one embodiment.

Technologies directed to hash spreading to extend a wireless coverage of a Wireless Local Area Network (WLAN) (e.g., IEEE 802.11) are described. There is an increasing demand for more smart devices and Internet of Things (IoT) devices for the outdoors and extending wireless coverage to gaps indoors. A number of long-range network technologies, such as LoRa, NB-IoT, and Sub-1GHz Bluetooth®, have been introduced. However, WLAN (e.g., Wi-Fi® technologies) have been the main connectivity solution across various wireless devices to provide the needed distance and throughput for smart-home control, audio-video (A/V) streaming, and voice-controlled applications. Different modulation and error-correction coding sets, referred to as modulation and coding schemes (MCSs), lead to different signal-to-noise (SNR) performance, and therefore different distances ranges for wireless coverage. For example, in Wi-Fi®, Orthogonal Frequency Division Multiplexing (OFDM) based 802.11 a/g/n/ac has a minimum SNR of 2 dB with a rate of 6 Mbps, and 802.11 b has an SNR of −1 dB at a rate of 1 Mbps, which can extend the distance range of OFDM-based Wi-Fi® by 40 percent. The distance range of Wi-Fi® technologies can present some gaps for whole-home coverage and coverage for the outdoors.

Aspects of the present disclosure address the above and other deficiencies by providing a new modem scheme with hash spreading that extends a distance range of a wireless coverage of a wireless device. Aspects of the present disclosure primarily extend the range for high-throughput data transfers through a modem scheme that can be implemented with existing WLAN standards or as part of a new wireless standard. Aspects of the present disclosure also provide a modem scheme, which leverages a set of spreading codes to spread the bits before any MCS procedures. Aspects of the hash spreading can be integrated in different portions of the signal processing flow, such as illustrated and described herein. Aspects of the present disclosure regarding hash spreading can provide a decent gain in receiver sensitivity, resulting in a better link budget and a longer communication distance. Aspects of the present disclosure regarding hash spreading can provide more security than conventional solutions as it can dynamically select a subset of spreading codes from a table, which can only be known to the communicating devices. In addition, an offset value can be shared between devices in connection with the known tables, which can add additional layers of security to the communication between devices. The hash-spreading scheme can greatly extend the range by at least two times. In the example of OFDM-based WLAN, the range can be extended by 280% using the hash spreading scheme. Aspects of the present disclosure can be used in connection with other radio technologies, including wireless local area network (WLAN) (e.g., Wi-Fi® technology), wireless personal area network (PAN) technologies (e.g., Bluetooth® and Bluetooth® Low Energy (BLE)), or other wireless technologies.

One method includes receiving input bits and control information that specifies a first data rate and a second modem scheme with a second signal range greater than a first signal range corresponding to a first modem scheme. The method generates a first sequence of bits by scrambling the input bits, the first sequence of bits having a first number of bits. The method generates a second sequence of bits by hash spreading the first sequence of bits using a set of spreading codes. The second sequence has a second number of bits greater than the first number of bits. The method generates the first symbols by modulating the second sequence, converts the first symbols into radio frequency (RF) signals, and sends the RF signals to the second wireless device.

FIG. 1 is a network diagram of a wireless network 100 with a first wireless device 102 with long-range logic 106 for extending a range of the wireless network 100, according to one embodiment. In this embodiment, the first wireless device 102 and the second wireless device 104 operate in the same channel. First wireless device 102 provides backhaul connectivity to wireless network 100, such as using a wired or wireless connection 122 to the Internet. For example, the first wireless device 102 can be connected to a gateway or a modem via wired or wireless connection 122. Alternatively, the first wireless device 102 can be a router or a gateway and can provide internet access to the second wireless device 104, a third wireless device 110, and a fourth wireless device 114, described below. First wireless device 102 can provide an access point to wireless devices 104, 110, 114 and other devices. The wireless devices 104, 110, 114, can be endpoint devices, client devices, or stations (STAs). In at least one embodiment, the first wireless device 102 is a controller, and the wireless device 104, 110, and 114, are controlees. In at least one embodiment, the first wireless device 102 fetches data, such as audio data, from the Internet and distributes the data (e.g., uncompressed audio) over the air to the four devices 104, 110, 114. In other embodiments, the first wireless device 102 communicates with more or fewer devices than three. In at least one embodiment, the first wireless device 102 is a camera device, such as a doorbell device. The camera device can transfer data to other wireless devices in a wireless network. A camera device can capture video and audio. For example, the camera device can detect a motion event and alert the other devices quickly without going through a cloud service. In another example, one of the other devices can detect an event and report the event to the controller, and the controller can notify all controlees of the detected event. In other embodiments, one or more wireless devices 102, 104, 110, and 114, can be a computer, a smartphone, a voice-controlled device, a wireless display, a wireless speaker, a game console, a wireless gamepad, or the like.

In at least one embodiment, the first wireless device 102 includes a host processor 124 and a WLAN radio 112. The WLAN radio 112 includes a MAC circuitry that includes hash spreading modes to send data to one or more wireless devices that extend a range of the wireless network 100, as described herein. The host processor 124 can execute an application 126, such as an audio application, a camera application, or the like. The application 126 can retrieve first data from the Internet via wired or wireless connection 122. As described in more detail below, the MAC circuitry can receive the first data from the application 126 and send the first data to one or more of the wireless devices 104, 110, and 114 using the WLAN radio 112. For example, MAC circuitry sends data bits and control information to a modem of the WLAN radio 112, where the modem includes the long-range logic 106. The modem, operating in a specific modem scheme, can perform hash spreading using a set of spreading codes to further spread the bits before any MCS procedures, including modulating the spread bits into symbols. The hash spreading extends the range of the wireless network 100. In some cases, the hash spreading disclosed herein can extend the range of the wireless network 100 by 280%. In other embodiments, the hash spreading can extend the range of the wireless network by other multipliers, such as 1.4×, 2×, 2.8×. After the hash spreading and the MCS procedures, the modem sends RF signals to the second wireless device 104, the third wireless device 110, and/or the fourth wireless device 114.

In at least one embodiment, the first wireless device 102 includes one or more additional radios, such as a PAN radio (e.g., BLE or Bluetooth® classic technology), a cellular radio, or the like. In at least one embodiment, a second radio can be used to communicate information between the first wireless device 102 and the other wireless devices 104, 110, 114. For example, the second radio can be used for acknowledgments (ACKs), control information, or the like. The host processor 124 can establish a first wireless connection 130 with the second wireless device 104 using the WLAN radio 112 and a second wireless connection 132 with the third wireless device 110 using the second radio. The first wireless connection 130 is a different from the second wireless connection 132.

In at least one embodiment, the application 126 generates first data to be sent to the second wireless device 104. The WLAN radio 112 includes a baseband processor and a transceiver. The baseband processor includes a MAC layer and a modem that operates in a first modem scheme with a first signal range and a second modem scheme with a second signal range greater than the first signal range. A signal range corresponds to a physical distance in a geographical area in which two devices can successfully communicate at a specified data rate. So, the first modem scheme can result in the first wireless coverage of a first geographical area and the second wireless coverage of a second geographical area that is greater than the first geographical area. In other embodiments, there can be multiple hash-spreading modes within the second modem scheme, but with different data ranges and spreading factors in achieving different range extensions. The spreading factor can represent a ratio of input bits to output bits. The spreading factor indicates how one or more bits are transformed into a sequence of two or more output bits. For example, the first modem scheme can be used for the Wi-Fi-MCS0 mode at 20 MHz with a data rate of 6 Mbps, and the second modem scheme can be used for one or more additional hash-spreading modes, such as MCS-HS1, MCS-HS2, and MCS-HS3. The hash-spreading modes MCS-HS1, MCS-HS2, and MCS-HS3, can have data rates of 3 Mbps, 1.5 Mbps, and 0.75 Mbps and spreading factors of 2, 4, and 8, respectively. Although there is no upper limit on the spreading factor, the present disclosure describes spreading factors up to 8.

In at least one embodiment, during operation, the modem receives, from the MAC layer, input bits of the first data and control information that specifies an index corresponding to one of the hash-spreading modes of the second modem scheme. As described herein, the index (e.g., MCS-HSx) is associated with i) a data rate and ii) a spreading factor. The index is also referred to as a spread sequence index. In another embodiment, the index can specify a data rate, a spreading factor, and an MCS-HS mode. The index can also be associated with a range multiplier (e.g., 1.4×, 2×, and 2.8×) and a SNR (e.g., −1 dB, −4 dB, and −7 dB0. The modem generates a first sequence of bits by scrambling the input bits and generates a second sequence of bits by hash spreading the first sequence of bits by the first spreading factor using a set of spreading codes. The spreading codes can be any codes known to the transmitting and receiving devices. In at least one embodiment, the spreading codes are orthogonal codes to provide communications that are less error prone. The spreading codes can be Hadamard codes, for example. The first sequence of bits has a first number of bits, and the second sequence of bits has a second number of bits greater than the first number of bits. The modem generates a third sequence of bits by performing error correction coding and/or interleaving the second sequence of bits. The modem generates first symbols by modulating the third sequence of bits. The modem converts the first symbols into discrete time-domain data and converts the discrete time-domain data into analog data. The modem sends the analog data to the transceiver. The transceiver modulates the analog data onto radio frequency (RF) signals and sends the RF signals to the second wireless device.

In one embodiment, to generate the second sequence of bits, the modem identifies a first table of orthogonal codes, corresponding to the index, from a set of tables, each corresponding to one of the plurality of hash-spreading modes. The set of tables are known to both devices. The modem selects a specified number of bits (e.g., M) from the first sequence of bits and determines, using a formula and the specified number of bits, a row index corresponding to a row of codes in the first table of orthogonal codes. The modem adds the row of codes to the second sequence of bits.

In another embodiment, the modem receives the index to be used for the MCS-HS mode and retrieves an appropriate table of codes corresponding to the index. The modem determines, using a formula, a row index for each input bit or each set of input bits (e.g., a pair of bits). The modem retrieves, from the table, a subset of codes corresponding to the row index for each of the input bit(s) to translate the first sequence into the second sequence. The number of input bits can be defined as a spreading input parameter provided in the control information. The spreading input parameter and the spreading factor determine a length of a spreading sequence.

In at least one embodiment, during operation, the application 126 generates first data to be sent to the second wireless device 104. The baseband processor includes a media access control (MAC) layer and a modem that sends or receives first data in a first modem scheme with a first signal range and a second modem scheme with a second signal range greater than the first signal range. When using the second modem scheme, the modem receives, from the MAC layer, input bits and control information that specifies a first data rate and the second modem scheme. The modem generates a first sequence of bits by scrambling the input bits, the first sequence of bits having a first number of bits. The modem generates a second sequence of bits by hash spreading the first sequence of bits using a set of spreading codes, the second sequence of bits has a second number of bits greater than the first number of bits. The modem generates first symbols by modulating the second sequence of bits and converts the first symbols into RF signals. The modem sends the RF signals to the second wireless device 104.

In a further embodiment, the modem converts the first symbols into the RF signals by converting the first symbols into discrete time-domain data, converting the discrete time-domain data into analog data, and modulating the analog data onto the RF signals.

The hash spreading can be integrated in different portions of a signal processing flow, such as illustrated and described below with respect to FIGS. 2A-2B.

Figure 2A:
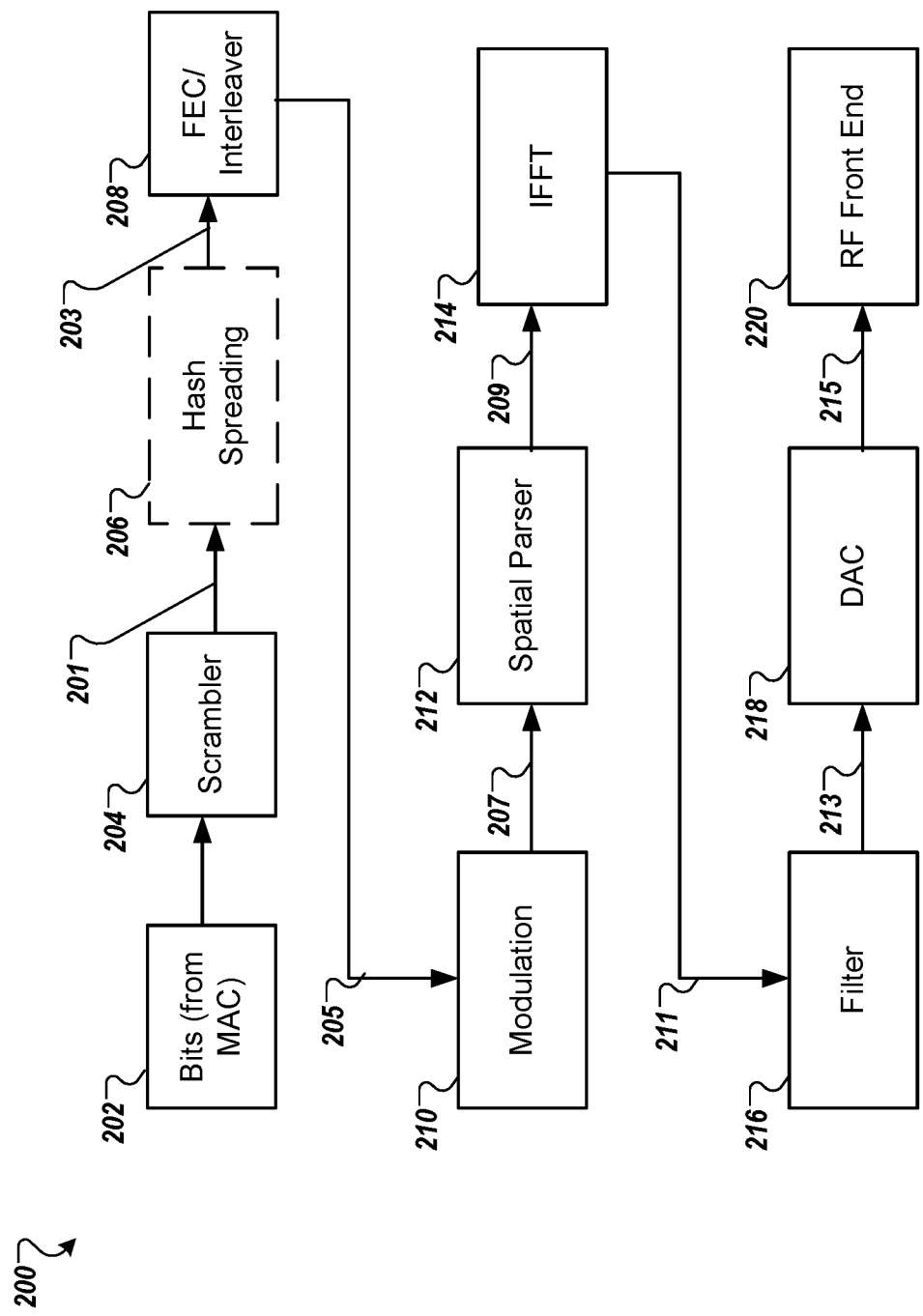
FIG. 2A is a flow diagram of a signal processing flow with hash spreading before error correction coding and interleaving, according to at least one embodiment.

FIG. 2A is a flow diagram of a signal processing flow 200 with hash spreading before error correction coding and interleaving, according to at least one embodiment. The signal processing flow 200 can be performed by one or more processing elements of a baseband processor, such as a digital signal processor (DSP). The baseband processor can include a MAC layer and a modem, as described herein. The modem can perform the signal processing flow 200. In at least one embodiment, the operations of the signal processing flow 200 can be performed by an integrated circuit that includes a digital-to-analog converter (DAC) coupled to RF front-end circuitry.

Referring to FIG. 2A, the signal processing flow 200 begins by the modem receiving input bits from the MAC layer (block 202). The modem also receives control information that specifies an MCS-HS index corresponding to one of the hash-spreading modes of the second modem scheme (e.g., the long-range modem scheme). As described herein, the MCS-HS index can be associated with at least a data rate and a spreading factor. The modem generates a first sequence of bits 201 by scrambling the input bits. The modem can scramble the bits using a scrambler. A scrambler can be a processing block of the baseband processor. The scrambler can add some randomness to the input bits. The first sequence 201 can have a first number of bits, N. The modem generates a second sequence of bits 203 by hash spreading the first sequence of bits 201 by the first spreading factor using a set of spreading codes (block 206). The second sequence of bits has a second number of bits greater than the first number of bits. The length of the second sequence depends on a spreading input parameter, M, and a spreading factor, SF. The spreading input parameter, M, specifies a number of input bits used to determine an index corresponding to a subset of the set of spreading codes. For example, if the spreading input parameter, M, is set to 2, then two bits of the first sequence of bits 201 are used to determine a first-row index of the table of codes being used. Then the next two bits in the first sequence of bits 201 are used to determine a second-row index. In this case, the length of the second sequence of bits 203 is $2^x N$, where x represents the MCS-HS index. In the case that x equals 1, the second sequence of bits 203 is two times the length of the first sequence of bits 201.

The modem can leverage the set of spreading codes to spread the input bits before any MCS procedures to greatly extend the range of the wireless coverages by a multiplier of the nominal range, X, where X is equal to or greater than 1.4. For example, in the example of the OFDM-based WLAN, the range can be extended 280% using the long-range modem scheme. A hash-spreading block can perform the hash spreading. The hash-spreading block is a processing block of the baseband processor. The hash-spreading block can use the set of spreading codes that are known by the communicating devices. The set of spreading codes can be orthogonal codes, such as Hadamard codes. The set of spreading codes can also add some security to the communication, since the set of spreading codes are known to the communicating devices.

Hash spreading at block 206 can provide a decent gain in receiver sensitivity, resulting in better link budgets and longer communication distances. Moreover, using hash spreading at block 206 is more secure than conventional solutions as it dynamically selects a subset of spreading sequences from a table, which can be only known to the communicating devices and therefore adds an additional layer of security. The principle of Hash Spreading at block 206 can contain a few steps. First, a set of spreading codes is pre-defined and known to both communicating devices. For example, a Walsh-Hadamard code generator can be used to generate a set of orthogonal codes, such as illustrates in FIGS. 3A-3B, where row indices start with zero. The MAC layer picks the desired rate and an MCS-HS mode using an MCS-HS index (e.g., MCS-HSx (x=1,2,3)). The MCS-HS index can be used to identify a specified data rate and a spreading ratio for the hash-spreading mode to be used, such as illustrated in Table 1 below.

TABLE 1

| Parameters | Date Rate (Mbps) | Nominal range (ratio) | Nominal SNR (dB) | Spreading Factor |
|---|---|---|---|---|
| WiFi-MCS0 | 6 | 1x | 2 | Reference (N/A) |
| MCS-HS1 | 3 | 1.4x | −1 | 2 (2→4) |
| MCS-HS2 | 1.5 | 2x | −4 | 4 (2→8) |
| MCS-HS3 | 0.75 | 2.8x | −7 | 8 (2→16) |

In Table 1, the first row includes a reference Wi-Fi mode, Wi-Fi-MCS0, which has a data rate of 6 Mbps and a nominal SNR of 2 dB. The reference Wi-Fi mode has a nominal range and is designated as a ratio, 1×. The reference Wi-Fi mode does not use a spreading ratio. The second row includes a first index (MCS-HS1) for a first hash-spreading mode. The first index is associated with a first data rate (e.g., 3 Mbps) that is ½ the data rate of the reference Wi-Fi mode and has an extended range of 1.4× the nominal range of the reference Wi-Fi mode. The first hash-spreading mode has an SNR of −1 dB and uses a spreading factor of 2, such as two input bits become four bits from the spreading codes. The third row includes a second index (MCS-HS2) for a second hash-spreading mode. The second index is associated with a second data rate (e.g., 1.5 Mbps) that is ¼ the data rate of the reference Wi-Fi mode and has an extended range of 2× the nominal range of the reference Wi-Fi mode. The second hash-spreading mode has an SNR of −4 dB and uses a spreading factor of 4, such as two input bits become eight bits from the spreading codes. The fourth row includes a third index (MCS-HS3) for a third hash-spreading mode. The third index is associated with a third data rate (e.g., 1.5 Mbps) that is ⅛ the data rate of the reference Wi-Fi mode and has an extended range of 2.8× the nominal range of the reference Wi-Fi mode. The third hash-spreading mode has an SNR of −7 dB and uses a spreading factor of 8, such as two input bits become sixteen bits from the spreading codes.

Once the desired rate and index are provided, the modem can use this information to generate the second sequence of bits 203 using a formula. For example, assuming the first sequence of bits 201 to be transmitted is a bit sequence of $b=[b\_0, b\_1, \ldots, b\_(N-1)]$, where $b\_i=0$ or 1, and $i=0,1, \ldots, N-1$, where N is the number of bits to be transmitted. Using M as the spreading input parameter (i.e., a number of input bits to be used for each code), the modem can select the first M bits to generate a first code in the second sequence of bits 203, select the next M bits to generate a second code in the second sequence of bits 203, and so on until. M together with spreading factor SF determines the spreading sequence length. One example is to set M=2, which leads to each pair of input bits to be spread into each code in the second sequence of bits 203. For example, the input sequence to the hash spreading would be $b\_2k, b\_(2k+1)$, with $k=0,1, \ldots, (N-2)/2$ each time, and the modem determines an index $j=[(2*b_{2k}+b_{2k+1})*2^{x-1}+J_{off}]\%2^{x+1}$, where $J_{off}$ is a preset constant offset with a range of $[0, 2^{x-1})$ and a default value of 0, x is the MCS-HS index provided by the MAC layer, and % indicates a modulo operation. The constant offset, $J_{off}$, can be sent via a signaling field in a packet to a receiving device to de-spread correctly. As a result of the formula, the modem generates an output with the second sequence of bits 203, i.e., a new binary sequence with a length of $2^x$N, after hash spreading at block 206. It should be noted that the rates and the key performance indicators modes of Table 1 are based on Hadamard spreading scheme indexed by MCS-HSx, as compared to the Wi-Fi-MCS0 at 20 MHz. In this example, the maximum range extension is 2.8× the reference Wi-Fi mode. Alternatively, other Wi-Fi modes can be used, and other key performance indicators can be achieved.

Figure 3A:
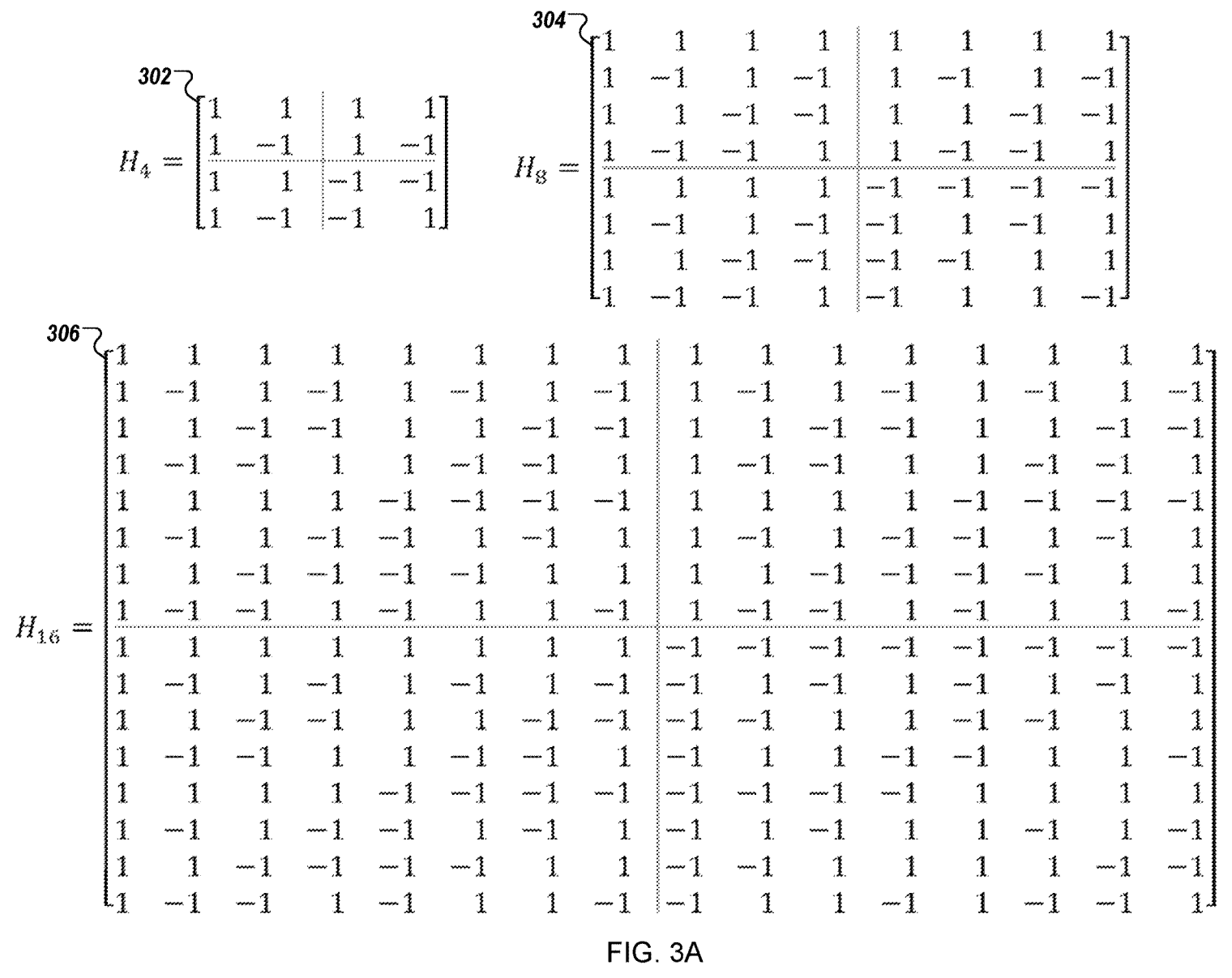

One example of hash spreading at block 206 can include using a spreading code set (e.g., 304) in FIG. 3A. FIG. 3A illustrates multiple code sets 302-306 used for hash spreading for three spreading factors (H4/H8/H16), corresponding to the three MCS-HS modes, respectively, according to at least one embodiment. In this example, the code sets 304 is selected for spreading the input bits by a spreading factor of 4. If the second hash-spreading mode, MCS-HS2, is selected with no constant offset, the index is x=2 and $J_{off}=0$. The transmit bit sequence is [1 0 0 1 1 1 0 0], which is translated to a sequence of row indices, s, of [4 2 6 0] using the formula described above for the spreading code set H8. The modem retrieves the codes from rows 4, 2, 6, 0 sequence from H8, resulting in a new transmit sequence of [1 1 1 1 −1 −1 −1 −1, 1 1 −1 −1 1 1 −1 −1, 1 1 −1 −1 −1 −1 1 1, 1 1 1 1 1 1 1 1].

Referring back to FIG. 2A, once the modem generates the second sequence of bits 203, the modem generates a third sequence of bits 205 by performing error correction coding and interleaving the second sequence of bits (block 208). The modem can perform forward error correction (FEC) and interleaving of the bits using an FEC block and an interleaver block. The FEC block and the interleaver block can be separate blocks. The interleaver block can add some randomness to the bits, and the FEC block can perform some error correction operations on the sequence of bits.

The modem can generate first symbols 207 by modulating the third sequence of bits 205 (block 210). The modem can modulate the bits using a modulator. The modulator can be a processing block of the baseband processor. When a Multiple-Input-Multiple-Output (MIMO) mode is used, the modem can use a spatial parser to spatially parse the first symbols (block 212). Spatial parsing can be used when the RF signals are split into multiple beams or sub-beams. In a single-input-single-output (SISO) mode, the spatial parser can be skipped. The modem converts the first symbols 207 or the spatially parsed symbols 209 into discrete time-domain data 211 (block 214). The modem can convert the first symbols 207 into discrete time-domain data 211 using an inverse Fast Fourier Transform (IFFT) block as described in more detail below. The modem can filter the discrete time-domain data 211 to obtain filtered data 213, and the modem converts the filtered data 213 into analog data 215 and sends the analog data 215 to the RF front-end circuitry (block 216). The RF front-end circuitry can include a transceiver. In some cases, the RF-front end circuitry can receive the digital data and include a DAC to convert the digital data to analog signals. The RF front-end circuitry (e.g., transceiver) can modulate the analog data 215 onto RF signals and sends the RF signals to another wireless device.

In one embodiment, the baseband processor of a radio includes an OFDM block in a digital domain. The OFDM block processes the bits using the digital signal processing described above and provides data to an analog RF front-end of a radio in an RF domain. The concepts used in a simple analog OFDM implementation can be extended to the digital domain by using a combination of Fast Fourier Transform (FFT) and Inverse Fast Fourier Transform (IFFT) digital signal processing. These transforms may digitally-modulated input data (data symbols) onto orthogonal subcarriers. In principle, the IFFT takes frequency-domain input data (complex numbers representing the modulated subcarriers) and converts it to the time-domain output data (analog OFDM symbol waveform). In a digitally implemented OFDM system, referred to as the OFDM block of the baseband processor, the input bits in a data bit stream are input into a baseband modulator. The input bits are grouped and mapped to source data symbols that are a complex number representing the modulation constellation point (e.g., the Binary Phase Shift Keying (BPSK) or Quadrature Amplitude Modulation (QAM) symbols that would be present in a single subcarrier system). The baseband modulator provides the output to a serial-to-parallel converter to provide inputs to an N-point IFFT. The transmitter treats these complex source symbols as though they are in the frequency domain and are the inputs to the N-point IFFT that transforms the data into the time domain. The N-point IFFT takes in N source symbols at a time, where N represents the number of subcarriers in the system. Each of these N input symbols has a symbol period of T seconds. The output of the N-point IFFT is N orthogonal sinusoids. These orthogonal sinusoids each have a different frequency, and the lowest frequency is a direct current (DC).

The input symbols are complex values representing the mapped constellation point and specify both the sinusoid amplitude and phase for that subcarrier. The output of the N-point IFFT is the summation of all N sinusoids. Thus, the N-point IFFT provides a simple way to modulate data onto N orthogonal subcarriers. The block of N output samples from the N-point IFFT make up a single OFDM symbol. A parallel-to-serial converter can receive the output of the N-point IFFT to convert the output into serial form. After some additional processing, such as adding a cyclic prefix to the output of the parallel-to-serial converter, the time-domain signal that results from the N-point IFFT is transmitted across a radio channel. Although not illustrated in FIG. 2A, at a receiver, an FFT block is used to process the received signal and bring it into the frequency domain, which is used to recover the original data bits.

For example, an 802.11a OFDM carrier signal (burst type) is the sum of one or more OFDM symbols, each comprised of 52 orthogonal subcarriers, with baseband data on each subcarrier being independently modulated using quadrature amplitude modulation (available formats: BPSK, QPSK, 16-QAM, or 64-QAM). This composite baseband signal is used to modulate the main RF carrier. The input data bitstream is encoded with convolutional coding and interleaving to begin the OFDM signal creation process. Each data stream is divided into groups of "n" bits (1 bit-BPSK, 2 bits-QPSK, 4 bits-16QAM, or 6 bits-64QAM) and converted into complex numbers (I+jQ) representing the mapped constellation point. Note that the bit rate will differ depending on the modulation format, a 64-QAM constellation (6 bits at a time) can have a bit rate of 54 Mbps, while a QPSK constellation (2 bits at a time) may only be 12 Mbps. Then 52 bins of the N-point IFFT are loaded. The 48 bins contain the constellation points mapped into frequency offset indexes ranging from −26 to +26, skipping 4 Pilot bins corresponding to four pilot subcarriers and zero bin corresponding to a DC subcarrier. Four pilot subcarriers can be inserted into frequency offset index locations −21, −7, +7, and +21. The zero bin is the Null or DC subcarrier and is not used; it contains a 0 value (0+j0). In some embodiments, additional subcarriers can be nulled in addition to the DC subcarrier. To do so, null tones and guard bands are inserted as inputs into the N-point IFFT.

When the N-point IFFT is completely loaded, the Inverse FFT is computed, giving a set of complex time-domain samples representing the combined OFDM subcarrier waveform. For example, the samples can be clocked out at 20 Mbps to create a 3.2 μs (20 Msps/64) duration OFDM waveform. To complete the OFDM symbol, a 0.8 μs duration Guard Interval (GI) is then added to the beginning of the OFDM waveform. This produces a single OFDM symbol with a time duration of 4 μs in length (3.2 μs+0.8 μs). The process is repeated to create additional OFDM symbols for the remaining input data bits. To complete the OFDM frame structure, the single OFDM symbols are concatenated together and then appended to a 16 microsecond (μs) Preamble (used for synchronization) and a 4 μs SIGNAL symbol (provides Rate and Length information). This completes the OFDM frame and is ready to be transmitted as an OFDM Burst by the analog RF front-end in the RF domain. The OFDM block of the baseband processor can output the OFDM symbol waveforms as I data and Q data.

The analog RF front-end in the RF domain can include one or more digital-to-analog converters (DACs) 320, 322, one or more low pass filters, one or more mixers, and an adder coupled to a power amplifier. The power amplifier is coupled to an antenna. The power amplifier applies one or more RF signals to the antenna to communicate the data (i.e., information) to another device. The RF domain can include a path for the I data and a separate path for the Q data.

In one embodiment, the baseband processor (not illustrated in FIG. 2B) uses a digital multi-carrier modulation scheme that defines a set of data subcarriers, pilot subcarriers, and DC subcarriers to communicate data in the same single channel. The baseband processor establishes a wireless communication link with a second device, such as an access point, using a 2.4 GHz frequency band or a 5 GHz frequency band. A modulator can be coupled to the baseband processor. The modulator can include the components described with respect to the RF front-end circuitry in the analog domain. Alternatively, the modulator can include other components to modulate the OFDM symbols.

Figure 2B:
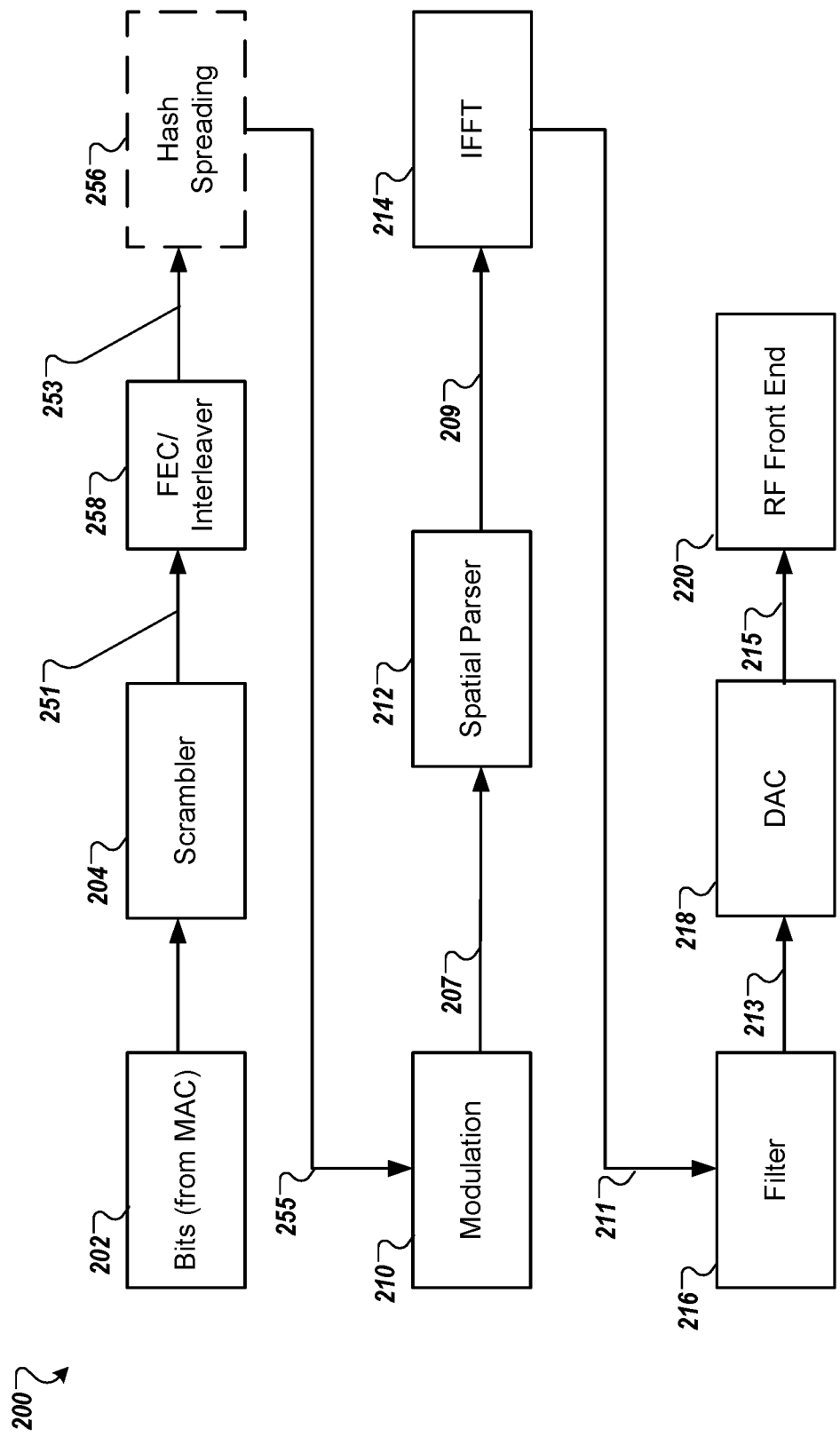
FIG. 2B is a flow diagram of a signal processing flow with hash spreading after error correction coding and interleaving, according to at least one embodiment.

FIG. 2B is a flow diagram of a signal processing flow 250 with hash spreading after error correction coding and interleaving, according to at least one embodiment. The signal processing flow 250 can be performed by one or more processing elements of a baseband processor, such as DSP. The baseband processor can include a MAC layer and a modem, as described herein. The modem can perform the signal processing flow 250. In at least one embodiment, the operations of the signal processing flow 250 can be performed by an integrated circuit that includes a DAC coupled to RF front-end circuitry.

Referring to FIG. 2B, the signal processing flow 250 is similar to the signal processing flow 200 as noted by similar reference numbers, except the hash spreading at block 256 occurs after the FEC/interleaving at block 258. More specifically, the FEC/Interleaver at block 258 receives a first sequence of bits 251 and generates a second sequence of bits 253. The hash spreading at block 256 spreads the second sequence of bits 253 to generate a third sequence of bits 255 input into the modulation block at block 210.

In at least one embodiment, the hash spreading at block 256 can be performed by specialized hardware that implements a Hadamard spreading technique. The specialized hardware can include circuitry to store the Hadamard code sets and an index of the corresponding MCS-HS modes, with the corresponding data rates and spreading factors. In at least one embodiment, the hash-spreading circuitry receives the control information that specifies an index corresponding to one of the hash-spreading modes of the second modem scheme. The index is associated with a first data rate and a first spreading factor. The hash-spreading circuitry can generate the third sequence of bits 255 by identifying a first table of orthogonal codes corresponding to the index. The hash-spreading circuitry selects a specified number of bits from the first sequence of bits and determines, using a formula and the specified number of bits, a row index corresponding to a row of codes in the first table of orthogonal codes. The hash-spreading circuitry adds the row of codes to the third sequence of bits 255. The hash-spreading circuitry then selects the following specified number of bits from the first sequence and determines, using the formula and the following specified number of bits, a next row index corresponding to another row of codes in the first table of orthogonal codes. The hash-spreading circuitry adds the other row of codes to the third sequence of bits 255 and so on until all input bits are translated to the sequence of codes.

In another embodiment, the hash spreading at block 256 can select a specified number of bits from the first sequence of bits. The hash spreading at block 256 determines a first index corresponding to a first subset of the set of spreading codes using the specified number of bits. The output sequence of bits includes the first subset of the set of spreading codes.

In another embodiment, single-bit hash spreading (e.g., M=1) can be used. As described herein, hash spreading uses one or more tables stored at both the transmitting and receiving devices. In one implementation, as shown in FIG. 3B, one or three tables of codes can be used for spreading factors up to eight.

Figure 3B:
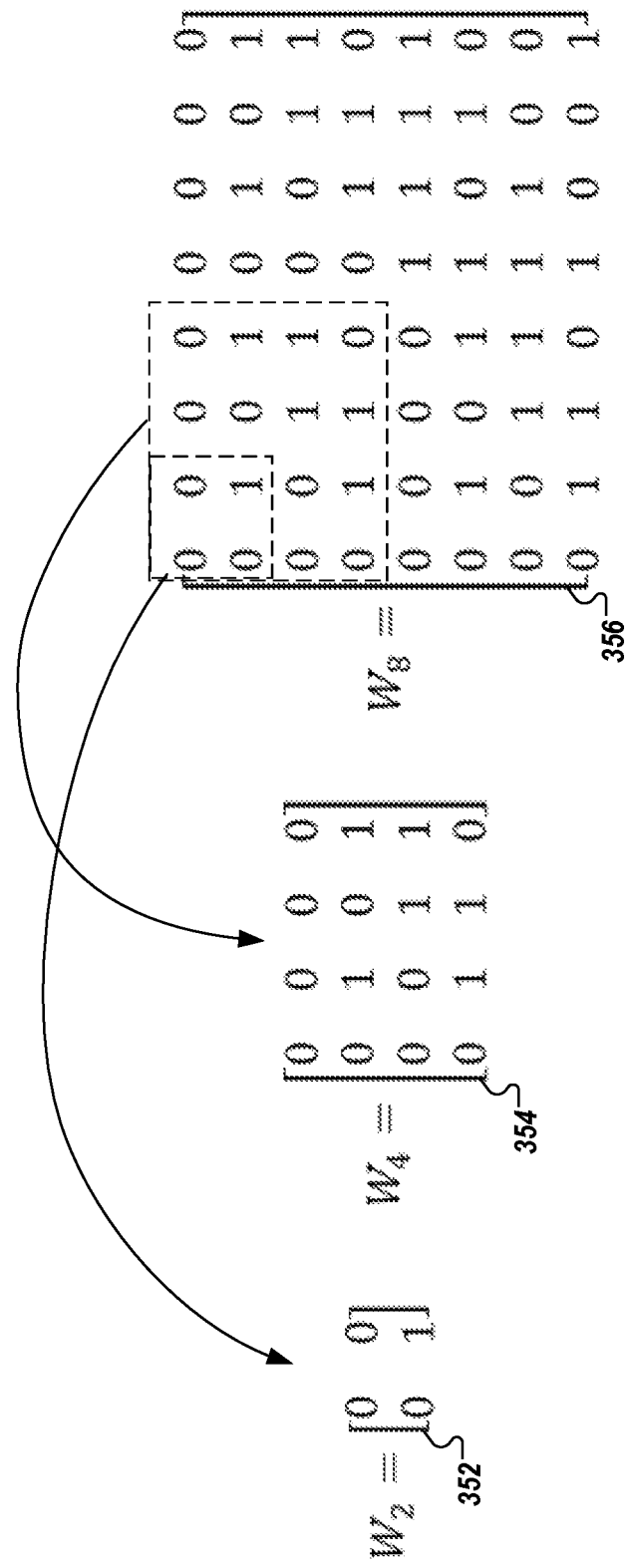
FIG. 3B illustrates three tables of codes for hash spreading, according to at least one embodiment.

FIG. 3B illustrates three tables of codes for hash spreading, according to at least one embodiment. A first table 352 is a 2×2 table with a first row with a first spreading code of 00 and a second row with a second spreading code 01. A second table 354 is a 4×4 table with four spreading codes. A third table 356 is a 8×8 table with eight spreading codes. In at least one embodiment, a single table can be stored at both devices and can be used for three different spreading factors, including a spreading factor of 8, a spreading factor of 4, and a spreading factor of 2. As illustrated in FIG. 3B, for a spreading factor of 4, the third table 356 can be divided into four equal regions, and the first quarter W8[1:4, 1:4] can be used, which is equivalent to the second table 354. For a spreading factor of 2, the upper quadrant of W8[1:2, 1:2] of the third table 356 can be used, which is equivalent to the first table 352.

Assume there is a table of L entries, each with a spreading binary sequence of $S_k$, k=0, . . . , L−1 with length D where D could be 2, 4, or 8. Assume that bit sequence b=[$b_0$, $b_1$, . . . , $b_{N-1}$], is the information be transmitted, where $b_i$=0 or 1,i=0, . . . , N−1. M is set to one for the single-bit hash spreading, and M bits are selected from b. For multi-bit hash spreading, M is set to greater than 2 (M>=1), and M number of bits is selected from b. A spreading index j=$J_{off}$ % L is chosen, where $J_{off}$ is a preset offset with a range of [0, L−1] and a default value of 0, and % indicates modulo operation. So each time, one bit $b_i$ is selected from bit sequence b, the output will become a sequence of length D, with the formula $O_i$=NOT[$b_i$ xor S(j)]. The concatenated output [$O_0$, . . . $O_{N-1}$] will have a length of N*D and is sent to a modulator and mapped into symbols. To illustrating the spreading technique, assuming a first hash-spreading mode is selected with a spreading factor of 2, then the first table 352 is W2=[0 0; 0 1], where S(0)=[0 0], S(1)=[0 1]. The transmit bit sequence is given by b=[1 0 1 1]. Choosing M=1 and $J_{off}$=0 and having for the $O_0$=[0 0], $O_1$=[1 1], $O_2$=[0 0], $O_3$=[0 0], the output sequence becomes [0 0 1 1 0 0 0 0].

In at least one embodiment for multi-bit hash spreading (M>1), the table(s) of spreading sequences is stored at both the transmitting device and the receiving device. In one implementation, the third table 356 (W8) in FIG. 3B can be used and divided into smaller matrices for the other spreading factors as described above.

Assume there is a table of L entries, each with a spreading binary sequence of $S_k$,k=0, . . . , L−1 with length D where D could be 2, 4, or 8. Assume that bit sequence b=[$b_0$, $b_1$, . . . , $b_{N-1}$], is the information be transmitted, where $b_i$=0 or 1,i=0, . . . , N−1. In one example, M is set to two (M=2), which leads to a pair of bits (where $b_{2k}$,$b_{2k+1}$, with k=0, 1, . . . ,(N−2)/2 each time and make a spreading index j=[(2*$b_{2k}$+$b_{2k+1}$)+$J_{off}$] % L, where $J_{off}$ is a preset offset with a range of [0, L−1] and a default value of 0, and % indicates modulo operation. So each time a pair of bits $b_{2k}$, $b_{2k+1}$ is picked from the bit sequence b, the output will become a sequence of length D, with the formula $O_i$=NOT[$b_i$ xor S(j)]. The concatenated output [$O_0$, . . . $O_{N-1}$] and will have a length of N*D. The concatenated output is sent to the modulator and mapped into symbols. To illustrating the spreading technique, assuming a first hash-spreading mode is selected with a spreading factor of 2, then the second table 354 is W4, and S(0)=[0 0 0 0], S[1]=[0 1 0 1], S[2]=[0 0 11 1] , S[3]=[0 1 1 0]. The transmit bit sequence is given by b=[1 0 1 1]. Choosing M=2 and $J_{off}$=1, and having the $O_0$ =[0 1 1 0], $O_1$=[0 0 0 0], the output sequence becomes [0 1 1 0 0 0 0 0].

In another embodiment, the spreading procedures can use a spreading factor of 8 with a data rate of 0.75 Mbps. Both transmitting and receiving devices have a table of N spreading sequences, each having eight codes, and the sequence is indexed at {s(1), s(2), . . ., s(N)}. The transmitting device can choose a parameter k, 1<=k<=N, which leads to s(k) as the spreading sequence. Then data bits "1" is spread to s(k), and "0" is spread to −s(k). The parameter, k, is included in the ALR-SIG element for the receiving device to decode. ALR-SIG itself can be spread with a fixed spreading sequence (e.g., s(1)).

In at least one embodiment, the modem inserts hash-spreading (HS) to achieve longer distances. The HS can be applied to BPSK and ½ mode only (MCS0). After spreading, there are three new data rates covering 3/1.5/0.75 Mbps, termed as MCS-HS1/2/3, as shown in Table 1 above. The HS does not interfere with beamforming protocols. In one embodiment, the HS spreads the bits after coding and interleaving, right before modulation. In another embodiment, the HS spreads the bits before coding and interleaving and before modulation. The HS leverages a set of spreading codes, where the code can be dynamically selected from a table. The index within the table is transmitted through a signal field (SIG field), which can be decoded at a receiving device. A frame structure can be used to include the SIG field. The frame structure can include a legacy preamble, a preamble/SIG field, and a data payload. The preamble/SIG field can be power boosted and repeated to optimize detection performance.

In at least one embodiment, the hash spreading can be implemented in a WLAN radio, including a Wi-Fi transceiver. When implemented in a Wi-Fi transceiver, there can be three long-range modes (also referred to as ALR modes). The ALR modes can serve as extensions to 802.11a/g MCS0 with 20 MHz-BPSK. The three ALR modes, ALR-[1,2,3], can have data rates that are [½, ¼, ⅛] rate of MCS0, or [3, 1.5, 0.75] Mbps respectively. In this embodiment, the hash spreading occurs after channel coding and interleaving and before mapping to the subcarrier tones. The spreading factor can be 2/4/8, and data bits of a bit sequence can be used to identify the correct sequence in a table of spreading sequences according to the spreading factor 2/4/8. As described above, a preamble of a packet can contain the index corresponding to the mode being used to decode the spreading sequences back to data bits properly. The preamble can contain other control information for hash-spreading, as illustrated in the example packets of FIGS. 4A-4B.

Figure 4A:
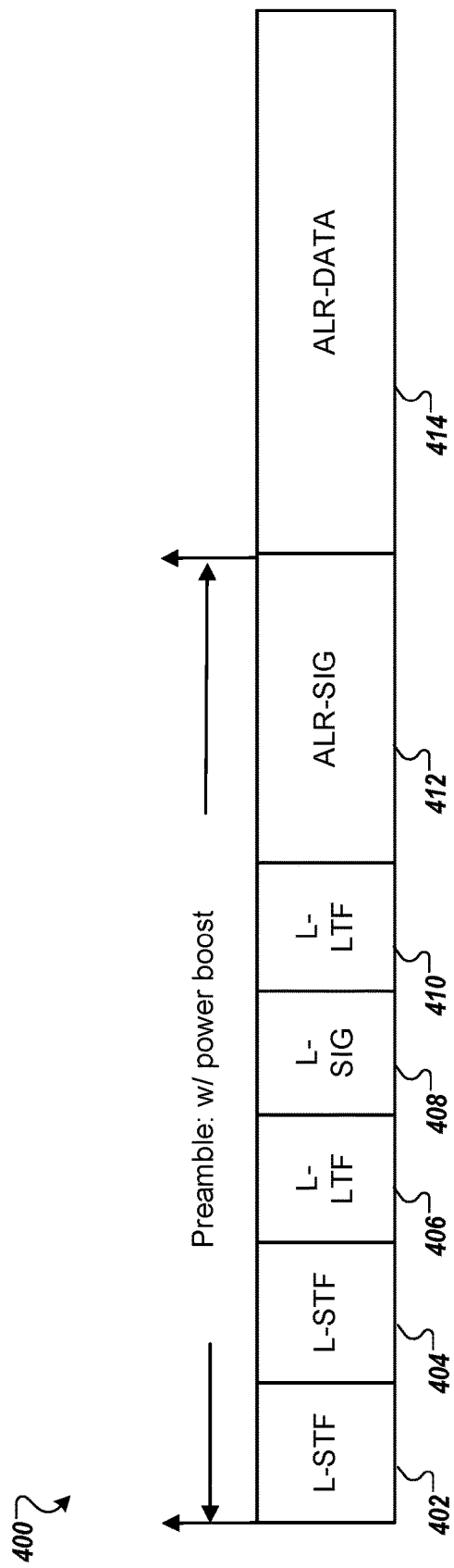
FIG. 4A is an example packet that includes control information for hash-spreading and hash-spread data, according to at least one embodiment.

FIG. 4A is an example packet 400 that includes control information for hash-spreading and hash-spread data, according to at least one embodiment. The packet 400 includes a preamble and a data payload 414. The preamble can be power boosted and include a couple of Legacy Short Training Fields (L-STF) 402, 404 and a Legacy Long Training Field (L-LTF) 406, a Legacy SIG field 408, another L-LTF 410, and an ALR-SIG field 412. The preamble can be power-boosted to the point where compliance is not an issue (e.g., up to 6 dB for MCS0). For example, the preamble plus signal fields can be power boosted with a value of xdB, where x is likely to equal to 3 Mbps or greater as required by IEEE standards. Repetitions of the preamble can achieve additional gain. In at least one embodiment, the preamble can be repeated two or more times. As illustrated in FIG. 4A, the L-STF and L-LTF can be repeated two or more times in at least one embodiment. In at least one embodiment, the packet includes an ALR-SIG field 412 that includes the spread sequence index (e.g., MCS-HSx) and can be coded at a lower coding rate introduced by spreading (e.g., SF=8 with fixed sequence and 0.75 Mbps). In at least one embodiment, a repeated L-STF is put at the beginning of a PHY frame. A repeated L-LTF can be after L-SIG to gain over channel estimation for LR in at least one embodiment. This can be repeated based on power boost gain. The power boost does not interfere with legacy reception, but a receiver may use the repetition for more gain. The preamble correlation can also be increased to obtain more gain.

Figure 4B:
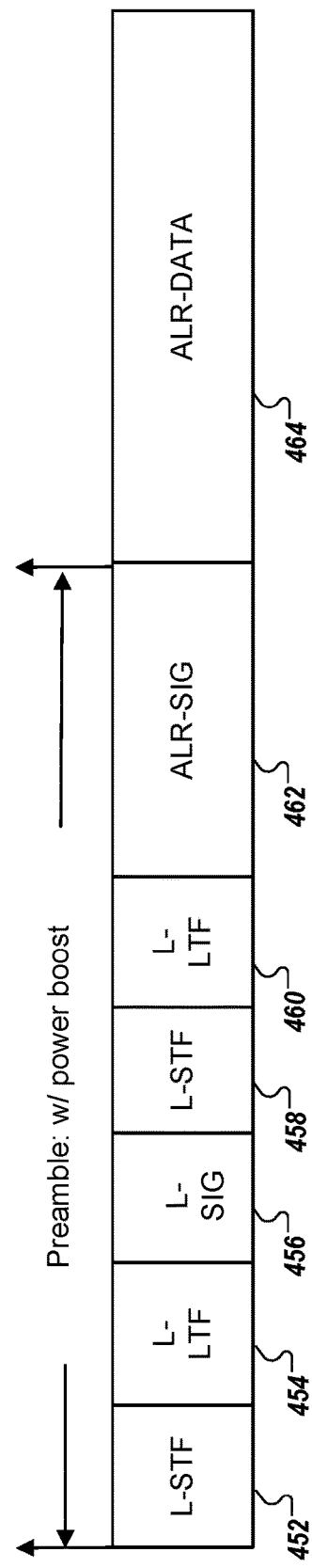
FIG. 4B is an example packet that includes control information for hash-spreading and hash-spread data, according to at least one embodiment.
Figure 5:
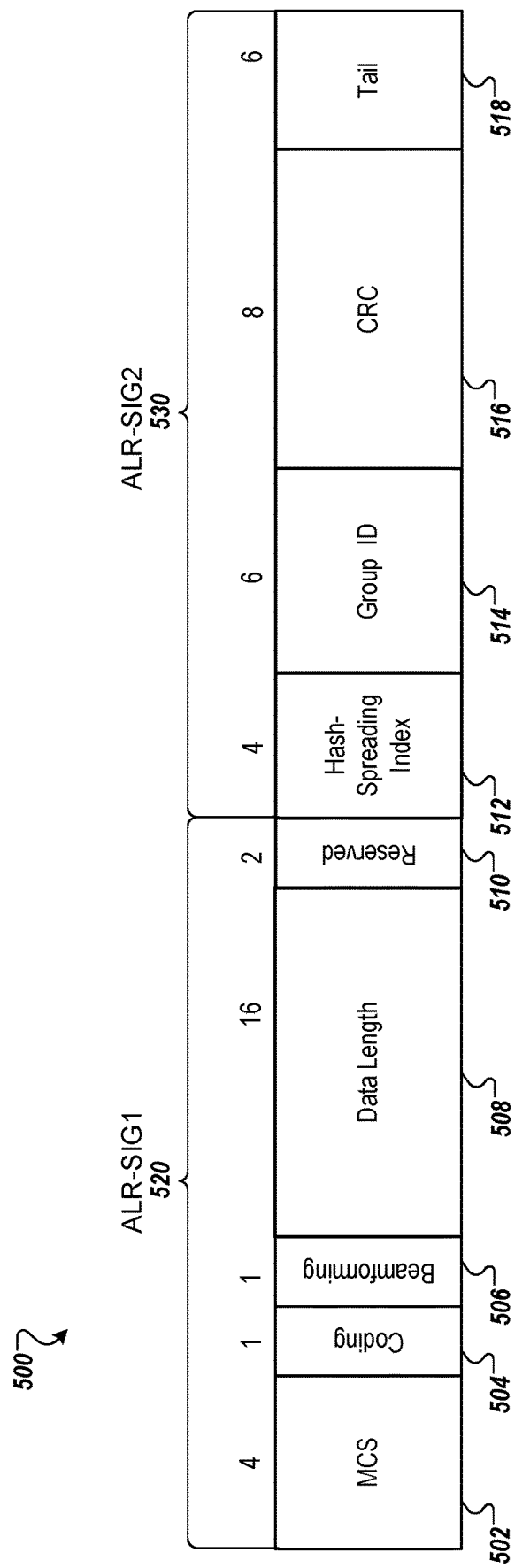
FIG. 5 is an example signal field element that includes control information for hash-spreading and hash-spread data, according to at least one embodiment.

FIG. 4B is an example packet 450 that includes control information for hash-spreading and hash-spread data, according to at least one embodiment. The packet 450 includes a preamble and a data payload 464 and is similar to packet 400 of FIG. 4A, except the packet 450 includes a different order of fields. The preamble can be power boosted and include a L-STF 452, a L-LTF 454, a Legacy SIG field 456, and then a L-STF 458 and another L-LTF 460, and an ALR-SIG field 462. The preamble can be power-boosted to the point where compliance is not an issue (e.g., up to 6 dB for MCS0). As illustrated in FIG. 4B, the L-STF and L-LTF can be repeated two or more times in at least one embodiment. In at least one embodiment, the packet includes an ALR-SIG field 462 that includes the spread sequence index (e.g., MCS-HSx) and can be coded at a lower coding rate introduced by spreading (e.g., SF=8 with fixed sequence and 0.75 Mbps). FIG. 5 is an example signal field element 500 that includes control information for hash-spreading and hash-spread data, according to at least one embodiment. The signal field element 500 is the ALR-SIG field 412 of FIG. 4A or ALR-SIG field 462 of FIG. 4B. The signal field element 500 includes an MCS field 502, a coding field 504, a beamforming field 506, a data length field 508, a reserved field 510, a hash-spreading index field 512, a Group ID field 514, a Cycle Redundancy Check (CRC) field 516, and a tail field 518. The MCS field 502 includes information about the MCS mode associated with hash spreading (e.g., MCS-HS1/2/3). The coding field 504 uses "0" by default for BCC and "1" for LDPC. The beamforming field 506 uses "0" for non-TX beamforming and "1" for Tx beamforming. The data length field 508 includes a value for the data length in bytes for the ALR packet. The reserved field 510 can be reserved bits for future use. The hash-spreading index field 512 can provide a spread sequence index to the hash-spreading mode. The Group ID field 514 can be the same as used in IEEE 802.11ac. When transmitting a single-user frame, this field will be 0 or 63. This field enables a receiver to determine whether the data payload is a single user or a multi-user. A group ID of 0 is used for frames sent to an access point (AP), and a group ID of 63 is used for frames sent to a client. The CRC field 516 can use the same CRC formula as in IEEE 802.11ac. The tail field 518 can include six zeros to terminate the BCC encoder.

In at least one embodiment, the signal field element 500 is a signaling field for long-range modes, similar to HT/VHT-SIG field in IEEE 802.11n/11ac. The ALR-SIG field contains all the necessary information to decode the packet. The ALR-SIG can include 48 bits in total and encoded with a convolution encoder with ½ rate. It can be divided into two OFDM symbols, each 4 us long, with a total length of 8 us. Depending on power-boosting gain, ALR-SIG can be repeated to increase SNR. With a minimum power-boosting gain of 3 dB on the preamble, ALR-SIG can be repeated four times. With a minimum power-boosting gain of 6 dB on the preamble, ALR-SIG can be repeated two times. In at least one embodiment, the signal field element 500 can be two symbols, ALR-SIG1 520 and ALR-SIG2 530, with 24-bit allocations each, as illustrated in FIG. 5. Each of these two symbols can be BCC ½ coded following the convention of IEEE Wi-Fi standards. The coded ALR symbols ALR-SIG1/2 can be repeated multiple times (e.g., eight times) and power boosted.

In some embodiments, to improve the detection sensitivity of the receiving device, the updated packet format with the new STF/LTF/SIG fields can be included in the preamble, and the preamble can be boosted at a minimum of xdB, where the rest of the gain comes from the repetitions of the preamble. The hash-spreading technique can increase security at a lower layer and allows dynamic selection, for each selection, a spreading sequence from a pre-defined table that is only known to both sides of the communication. The hash-spreading can provide a low-cost, low-latency scheme with quick spreading techniques. In at least one embodiment, the MAC layer can implement a MAC protocol that enables the three additional hash-spreading modes described herein. Alternatively, the MAC layer can implement more or less hash-spreading modes.

Figure 6:
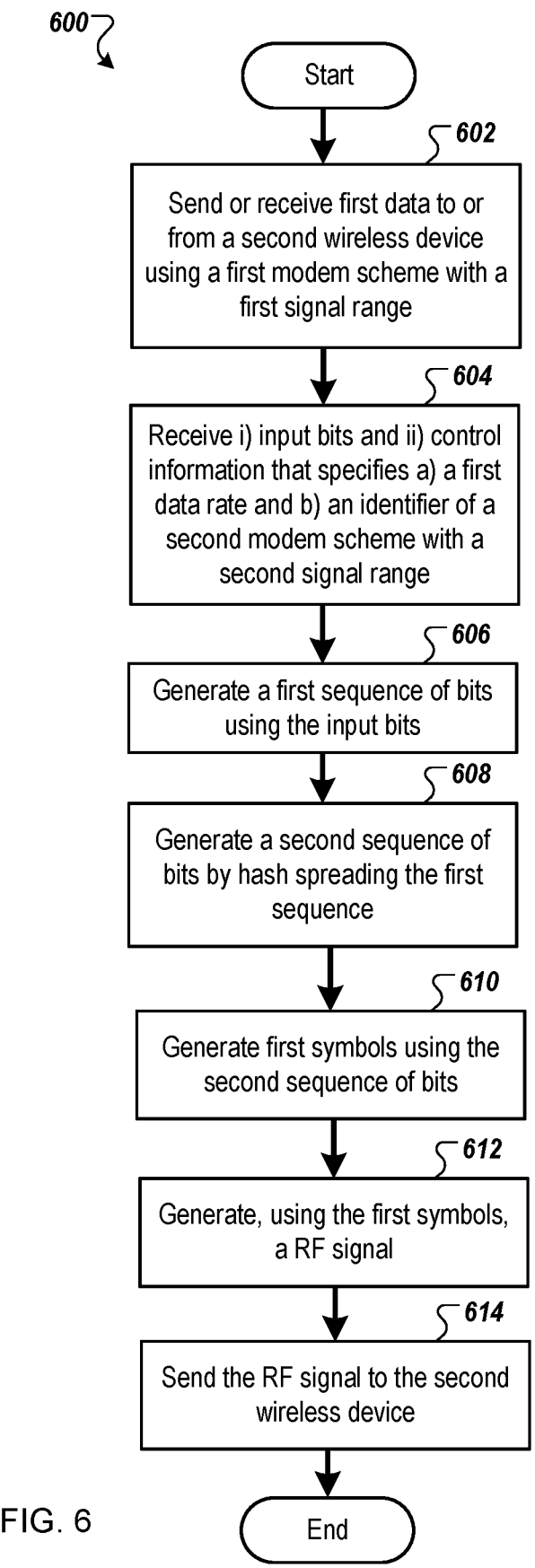
FIG. 6 is a flow diagram of a method of hash spreading to extend a range of a wireless network, according to at least one embodiment.

FIG. 6 is a flow diagram of a method 600 of hash spreading to extend a range of a wireless network, according to at least one embodiment. The method 600 may be performed by processing logic that comprises hardware (e.g., circuitry, dedicated logic, programmable logic, microcode, etc.), software, firmware, or a combination thereof. In one embodiment, the method 600 may be performed by the first wireless device 102 of FIG. 1. In another embodiment, the method 600 is performed by any of the second wireless device 104, the third wireless device 110, or the fourth wireless device 114. In another embodiment, the method 600 is performed by the modem of the baseband processor. In another embodiment, the method 600 is performed by any wireless device described herein.

Referring back to FIG. 6, the processing logic begins the method 600 by sending or receiving first data to or from a second wireless device using a modem in a first modem scheme with a first signal range (block 602). The processing logic receiving i) input bits and ii) control information that specifies a) a first data rate and b) an identifier of a second modem scheme with a second signal range greater than the first signal range (block 604). The processing logic generates, using the input data, a first sequence of bits, the first sequence of bits having a first number of bits (block 606). The processing logic generates a second sequence of bits by hash spreading the first sequence of bits (block 608). The second sequence of bits has a second number of bits greater than the first number of bits. The processing logic generates first symbols using the second sequence of bits (block 610). The processing logic generates, using the first symbols, a RF signal (block 612). The processing logic sends the RF signal to the second wireless device (block 614), and the method 600 ends.

In a further embodiment, the processing logic converts the first symbols at block 612 by converting the first symbols into discrete time-domain data, converting the discrete time-domain data into analog data, and modulating the analog data onto the RF signals. As described herein, the input data can be for a SISO mode or a MIMO mode. When in a MIMO mode, the processing logic spatially parses the first symbols after block 610 before converting the first symbols into the discrete time-domain data at block 612. In one embodiment, the processing logic filters the discrete time-domain data before converting the discrete time-domain data into the analog data.

In at least one embodiment, as described herein, the processing logic performs error correction coding and interleaving on the second sequence of bits after generating the second sequence of bits at block 608 and before generating the first symbols at block 610. In another embodiment, the processing logic performs error correction coding and interleaving on the first sequence of bits before generating the second sequence of bits at block 608.

In another embodiment, the processing logic generates the second sequence of bits at block 608 by identifies a specified number of bits (e.g., M=1, M=2) from the first sequence of bits and determining, using the specified number of bits, a first index corresponding to a first subset of the set of spreading codes. The second sequence of bits includes the first subset of the set of spreading codes. The processing logic identifies the next set of a specified number of bits from the first sequence and determines a second index corresponding to a second subset of the set of spreading codes using the next set of bits. The second subset of codes is appended to the first subset of codes.

In another embodiment, the processing logic generates the second sequence of bits at block 608 by identifying a first table of orthogonal codes corresponding to the index. The processing logic identifies a specified number of bits from the first sequence of bits. The processing logic determines, using a formula and the specified number of bits, a row index corresponding to a row of codes in the first table of orthogonal codes. The second sequence of bits comprises the row of codes. The processing logic identifies the next set of a specified number of bits from the first sequence and determines, using the next set of bits, a second-row index corresponding to a second row of codes in the first table of orthogonal codes. The second row of codes is appended to the row of codes.

In another embodiment, the processing logic generates a data packet with a preamble and a data payload. The data payload includes the first symbols and the preamble includes an index corresponding to one of the hash-spreading modes of the second modem scheme. The index can be used by the receiving device to know which one of the hash-spreading modes were used to hash spread the data payload.

Figure 7:
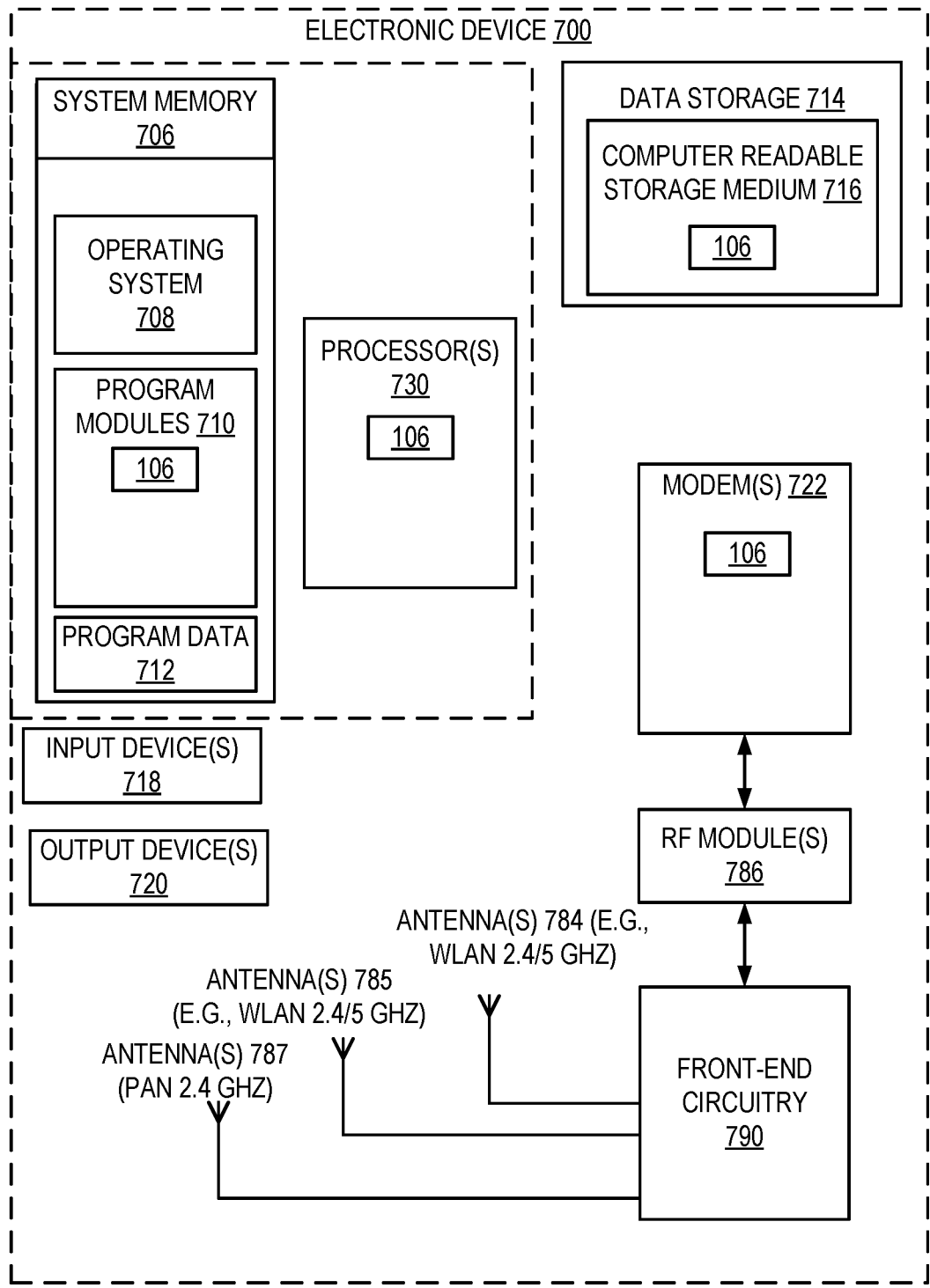
FIG. 7 is a block diagram of a wireless device for hash spreading to extend a range of a wireless network according to one embodiment.

FIG. 7 is a block diagram of a wireless device 700 for hash spreading to extend a range of a wireless network according to one embodiment. The wireless device 700 may correspond to the mesh network devices described above with respect to FIGS. 1-6. Alternatively, the wireless device 700 may be other electronic devices, as described herein.

The wireless device 700 includes one or more processor(s) 730, such as one or more CPUs, microcontrollers, field-programmable gate arrays, or other types of processors. The wireless device 700 also includes system memory 706, which may correspond to any combination of volatile and/or non-volatile storage mechanisms. The system memory 706 stores information that provides operating system component 708, various program modules 710, program data 712, and/or other components. In one embodiment, the system memory 706 stores instructions of methods to control the operation of the wireless device 700. The wireless device 700 performs functions by using the processor(s) 730 to execute instructions provided by the system memory 706. In one embodiment, the program modules 710 may include long-range logic 106. The long-range logic 106 may perform some of the operations of reducing medium access contention described herein.

The wireless device 700 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein. Instructions for the program modules 710 (e.g., long-range logic 106) may reside, completely or at least partially, within the computer-readable storage medium 716, system memory 706, and/or within the processor(s) 730 during execution thereof by the wireless device 700, the system memory 706 and the processor(s) 730 also constituting computer-readable media. The wireless device 700 may also include one or more input devices 718 (keyboard, mouse device, specialized selection keys, etc.) and one or more output devices 720 (displays, printers, audio output mechanisms, etc.).

The wireless device 700 further includes a modem 722 to allow the wireless device 700 to communicate via a wireless connection (e.g., such as provided by the wireless communication system) with other computing devices, such as remote computers, an item providing system, and so forth. The modem 722 can be connected to one or more radio frequency (RF) modules 786. The RF modules 786 may be a WLAN module, a WAN module, a PAN module, a GPS module, or the like. The antenna structures (antenna(s) 784, 785, 787) are coupled to the RF circuitry 783, which is coupled to the modem 722. The RF circuitry 783 may include radio front-end circuitry, antenna-switching circuitry, impedance matching circuitry, or the like. The antennas 784 may be GPS antennas, NFC antennas, other WAN antennas, WLAN or PAN antennas, or the like. The modem 722 allows the wireless device 700 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 722 may generate signals and send these signals to the antenna(s) 784 of a first type (e.g., WLAN 5

GHz), antenna(s) 785 of a second type (e.g., WLAN 2.4 GHz), and/or antenna(s) 787 of a third type (e.g., WAN), via RF circuitry 783, and RF module(s) 786 as described herein. Antennas 784, 785, 787 may be configured to transmit in different frequency bands and/or using different wireless communication protocols. The antennas 784, 785, 787 may be directional, omnidirectional, or non-directional antennas. In addition to sending data, antennas 784, 785, 787 may also receive data, which is sent to appropriate RF modules connected to the antennas. One of the antennas 784, 785, 787 may be any combination of the antenna structures described herein.

In one embodiment, the wireless device 700 establishes a first connection using a first wireless communication protocol, and a second connection using a different wireless communication protocol. The first wireless connection and second wireless connection may be active concurrently, for example, if a wireless device is receiving a media item from another wireless device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of the WMN, and the second wireless connection may be associated with serving a content file to a client consumption device, as described herein.

Though a modem 722 is shown to control transmission and reception via the antenna (784, 785, 787), the wireless device 700 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A first wireless device comprising:
    a first processor that generates first data; and
    a wireless local area network (WLAN) radio comprising a baseband processor and a transceiver, wherein the baseband processor comprises a media access control (MAC) layer and a modem that operates in (i) a first modem scheme having a first signal range and (ii) a second modem scheme having a second signal range that is greater than the first signal range, wherein the modem in the second modem scheme:
        receives, from the MAC layer, input bits of the first data and a first spreading factor;
        generates a first sequence of bits by scrambling the input bits, the first sequence of bits having a first number of bits;
        generates a second sequence of bits by hash spreading the first sequence of bits according to the first spreading factor, the second sequence of bits having a second number of bits that is greater than the first number of bits;

generates a third sequence of bits by performing error correction coding and interleaving the second sequence of bits;

generates first symbols by modulating the third sequence of bits;

converts the first symbols into discrete time-domain data;

converts the discrete time-domain data into analog data;

sends the analog data to the transceiver; and wherein the transceiver:

modulates the analog data onto radio frequency (RF) signals to generate modulated RF signals; and sends the modulated RF signals to a second wireless device.

2. The first wireless device of claim 1, wherein the modem further receives index information corresponding to a first hash-spreading mode of the second modem scheme, and wherein to generate the second sequence of bits, the modem:

identifies a first set of orthogonal codes corresponding to the index information; and determines, using a specified number of bits from the first sequence of bits, a subset of codes from the first set of orthogonal codes, wherein the second sequence of bits comprises the subset of codes.

3. A method comprising:

sending or receiving, by a first wireless device to or from a second wireless device, first data using a modem in a first modem scheme with a first signal range;

receiving, by the modem, (i) input data and ii) control information that specifies a) a first data rate and (b) information about a second modem scheme with a second signal range that is greater than the first signal range;

generating, using the input data, a first sequence of bits, the first sequence of bits having a first number of bits;

generating a second sequence of bits by hash spreading the first sequence of bits, the second sequence of bits having a second number of bits that is greater than the first number of bits;

generating first symbols using the second sequence of bits;

generating, using the first symbols, a radio frequency (RF) signal; and sending the RF signal to the second wireless device.

4. The method of claim 3, wherein converting the first symbols into the RF signal comprises:

converting the first symbols into discrete time-domain data;

converting the discrete time-domain data into analog data; and modulating the analog data onto the RF signal.

5. The method of claim 4, further comprising spatially parsing the first symbols before converting the first symbols into the discrete time-domain data.

6. The method of claim 3, further comprising performing error correction coding and interleaving on the second sequence of bits before generating the first symbols.

7. The method of claim 3, further comprising performing error correction coding and interleaving on the first sequence of bits before generating the second sequence of bits.

8. The method of claim 3, wherein generating the second sequence of bits comprises:

identifying a first number of bits from the first sequence of bits; and determining, using the first number of bits from the first sequence of bits, a first index corresponding to a first subset of a set of spreading codes, wherein the second sequence of bits comprises the first subset of the set of spreading codes.

9. The method of claim 8, wherein the set of spreading codes comprises orthogonal codes.

10. The method of claim 3, wherein the control information specifies an index corresponding to one of a plurality of hash-spreading modes of the second modem scheme, and wherein generating the second sequence of bits comprises:

identifying a first table of orthogonal codes, corresponding to the index;

identifying a first number of bits from the first sequence of bits; and determining, using the first number of bits, a row index corresponding to a row of codes in the first table of orthogonal codes, wherein the second sequence of bits comprises the row of codes.

11. The method of claim 3, further comprising generating a data packet comprising a preamble and a data payload, wherein the data payload comprises the first symbols and the preamble comprises an index corresponding to one of a plurality of hash-spreading modes of the second modem scheme.

12. A first wireless device comprising:

a first processor; and a wireless local area network (WLAN) radio comprising a baseband processor and a transceiver, wherein the baseband processor comprises a media access control (MAC) layer and a modem that supports a first modem scheme having a first signal range and a second modem scheme having a second signal range that is greater than the first signal range, wherein the modem in the second modem scheme is configured to:

receive input data;

generate a first sequence of bits using the input data, the first sequence of bits having a first number of bits;

generate a second sequence of bits by hash spreading the first sequence of bits, the second sequence of bits having a second number of bits that is greater than the first number of bits;

generate first symbols using the second sequence of bits;

generate, using the first symbols, a radio frequency (RF) signal; and send the RF signal to a second wireless device.

13. The first wireless device of claim 12, wherein, to convert the first symbols into the RF signal, the modem is further configured to:

convert the first symbols into discrete time-domain data;

convert the discrete time-domain data into analog data; and modulate the analog data onto the RF signal.

14. The first wireless device of claim 13, wherein the modem is further configured to spatially parse the first symbols before the first symbols are converted into the discrete time-domain data.

15. The first wireless device of claim 12, wherein the modem is further configured to perform error correction coding and interleaving on the second sequence of bits after the second sequence of bits is generated and before the first symbols are generated.

16. The first wireless device of claim 12, wherein the modem is further configured to perform error correction coding and interleaving on the first sequence of bits before the second sequence of bits is generated.

17. The first wireless device of claim 12, wherein, to generate the second sequence of bits, the modem is further configured to:
   identify a first number of bits from the first sequence of bits; and
   determine, using the first number of bits, a first index corresponding to a first subset of a set of spreading codes, wherein the second sequence of bits comprises the first subset of the set of spreading codes.

18. The first wireless device of the claim 17, wherein the set of spreading codes comprises orthogonal codes.

19. The first wireless device of claim 12, wherein the modem is further configured to receive control information, wherein the control information specifies an index corresponding to one of a plurality of hash-spreading modes of the second modem scheme, and wherein, to generate the second sequence of bits, the modem is further configured to:
   identify a first table of orthogonal codes, corresponding to the index;
   identify a first number of bits from the first sequence of bits; and
   determine, using the first number of bits, a row index corresponding to a row of codes in the first table of orthogonal codes, wherein the second sequence of bits comprises the row of codes.

20. The first wireless device of claim 12, wherein the modem is further configured to generate a packet comprising a preamble and a data payload, wherein the data payload comprises the first symbols and the preamble comprises an index corresponding to one of a plurality of hash-spreading modes of the second modem scheme.

* * * * *